J. R. KENNEY.
SHAFT OSCILLATOR.
APPLICATION FILED SEPT. 7, 1917.

1,339,897.

Patented May 11, 1920.

WITNESSES:
T. R. Krear
F. A. Lind

INVENTOR
James R. Kenney
BY
Wesley G. Carr
ATTORNEY

UNITED STATES PATENT OFFICE.

JAMES R. KENNEY, OF BRADDOCK, PENNSYLVANIA, ASSIGNOR TO WESTINGHOUSE ELECTRIC & MANUFACTURING COMPANY, A CORPORATION OF PENNSYLVANIA.

SHAFT-OSCILLATOR.

1,339,897.  Specification of Letters Patent.  Patented May 11, 1920.

Application filed September 7, 1917. Serial No. 190,140.

*To all whom it may concern:*

Be it known that I, JAMES R. KENNEY, a citizen of the United States, and a resident of Braddock, in the county of Allegheny and State of Pennsylvania, have invented a new and useful Improvement in Shaft-Oscillators, of which the following is a specification.

My invention relates to shaft oscillators and it has for its object to provide a simple and inexpensive auxiliary device whereby the proper operation of the oscillating device shall be insured.

Figure 1:
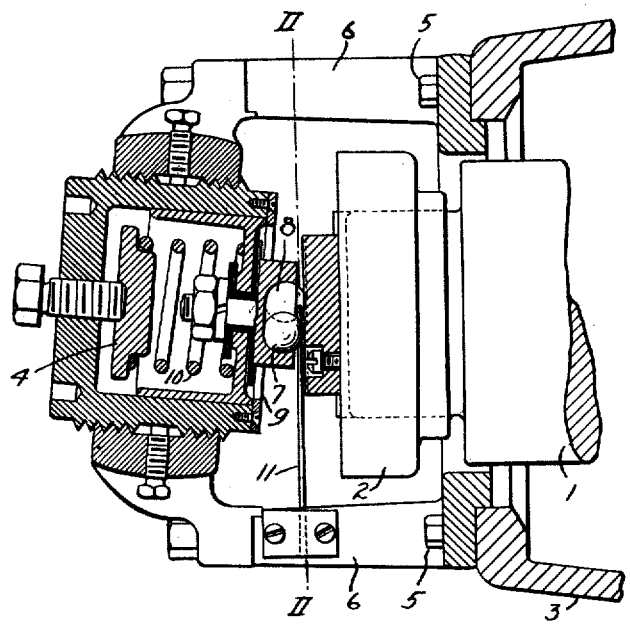
Figure 2:
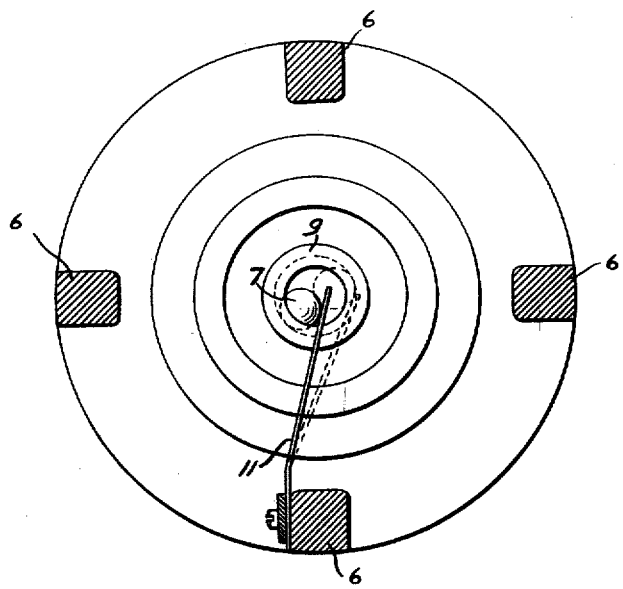

Referring to the accompanying drawing, Figure 1 is a sectional view of a portion of a dynamo electric machine provided with an oscillator constructed in accordance with my invention. In Fig. 2 is a sectional view of the apparatus shown in Fig. 1, the section being taken along the line II—II of Fig. 1.

Heretofore, it has been customary, in constructing a shaft oscillator, to allow the oscillator ball to move freely within the ball race, which is inclined with respect to the end surface of the shaft. When this construction is used, the oscillator ball is sometimes caused to move very rapidly, either on account of the shaft becoming magnetized, or on account of the excessive speed of the shaft and this is objectionable because the shaft will continually meet the ball when it is in its upper-most position, which is nearer to the shaft than its lower-most position. In this way, the shaft will not be permitted to reach the oscillator ball when in its lower-most position, thus materially reducing the amplitude of its oscillation.

By my invention, I provide a device whereby the ball is not permitted to move continually, but is stopped when in approximately its lower-most position and is held there until the shaft, returning from its previous oscillation, again engages the ball in its lower-most position. The ball and shaft remain in engagement until the ball reaches its upper-most position, during which time the shaft has been moved in the direction away from the ball race. On account of its inertia, the shaft continues to move away from the ball for a short interval of time after it has become disengaged therefrom, and on being returned to its original position, again engages the ball, which is being held in its lower-most position.

Another object of my invention is to provide an oscillating device which may be simple to adjust and which may be removed from, and replaced in, the machine without stopping the latter. This is accomplished by providing a flange on the outer edge of the ball race which prevents the ball from leaving the race when disengaged from the shaft. This enables the operator to remove and to replace the oscillating device without interfering with the operation of the machine. Another advantage of the flanged ball race is that, as soon as the shaft engages the ball, the oscillating device needs no further adjustment. In the old type of ball race, when the oscillating device was being removed from the machine, the ball remained in engagement with the shaft until it fell out of the ball race. The ball could not be replaced in the oscillating device without stopping the machine, or incurring great danger to the operator, and, after the machine was started, the oscillator had to be carefully adjusted, since the ball could remain in engagement with the end of the shaft without being adjusted, and, therefore, be of no service.

Referring more particularly to the drawing, the dynamo electric machine is provided with a shaft 1 which, in turn, is provided with a bearing member 2 which is surrounded by an end bell 3 of the dynamo electric machine frame. An oscillator device 4 is attached to the end bell 3 by means of bolts 5 and is supported by four longitudinally extending supports 6. An oscillator ball 7 is adapted to move within a ball race 8, which is provided with an outer flanged edge to prevent escape of the ball. The ball race 8 is a portion of a member 9 which has a force exerted upon it in the direction of the shaft by a spring 10, which aids in causing the oscillation of the shaft. The oscillator ball is adapted to be stopped when in approximately its lowermost position by a leaf spring member 11, as shown in Fig. 2, which prevents continuous movement of the oscillator ball with the shaft 1.

Throughout this specification and in the claims attached hereto the term "oscillator-ball race" should be defined as a ball race inclined to a plane perpendicular to the shaft and having the lowermost portion of the race farthest from the shaft. The term "oscillator ball" refers to the ball which revolves within the aforementioned race.

While I have herein described in detail a form of my invention and one application of the same, it will be obvious to those skilled in the art that it is not so limited but is susceptible of various minor changes and modifications without departing from the spirit and scope thereof, and I desire, therefore, that only such limitations shall be placed thereupon as are imposed by the prior art or are specifically set forth in the appended claims.

I claim as my invention:

1. A shaft-oscillating device comprising a shaft, an oscillator ball, an oscillator ball race and damping means for preventing movement of said ball in synchronism with said shaft.

2. A shaft-oscillating device comprising a shaft, an oscillator ball, an oscillator-ball race and means for preventing continuous movement of said ball, said means consisting of a spring member which is adapted to interfere with the movement of said ball.

3. A shaft-oscillating device comprising a shaft, an oscillator ball, an oscillator-ball race and means for preventing continuous movement of said ball, said means consisting of a leaf spring which is adapted to engage said ball when in approximately its lowermost position.

4. A shaft-oscillating device comprising a shaft, an oscillator ball, an oscillator-ball race and means for preventing movement of said ball in synchronism with said shaft, said means consisting of a single leaf spring which is of such resiliency and so disposed as to stop said ball when in approximately its lowermost position and not in engagement with said shaft and to permit said ball to continue to move when next engaged by said shaft.

In testimony whereof, I have hereunto subscribed my name this 30th day of Aug., 1917.

JAMES R. KENNEY.